Sept. 26, 1944.  C. B. MOORE  2,359,236
PNEUMATIC TRANSMISSION SYSTEM
Filed July 29, 1942
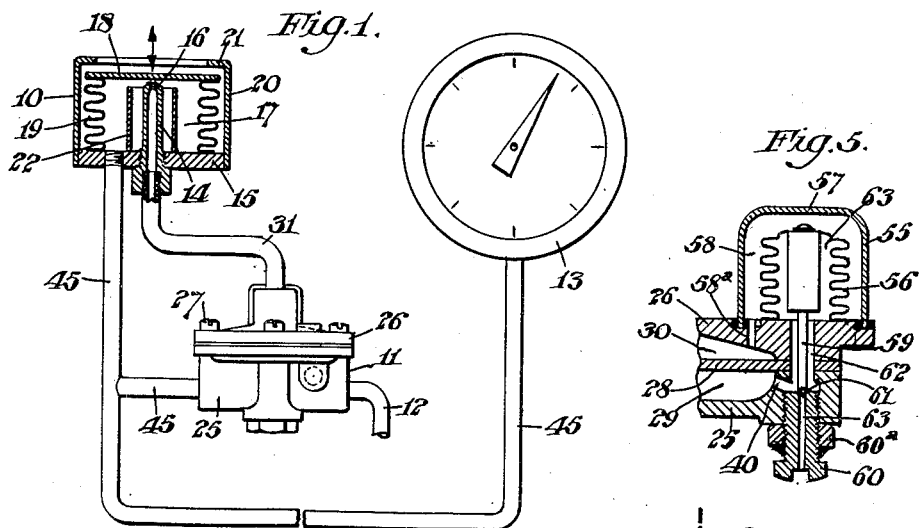
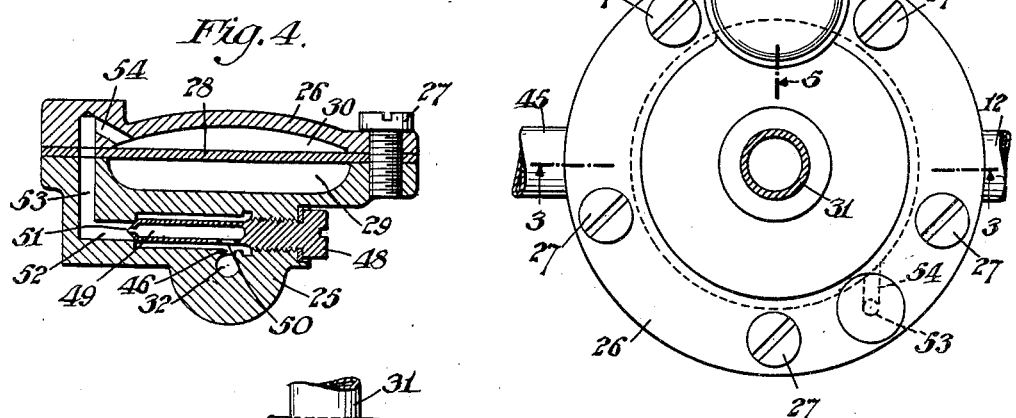
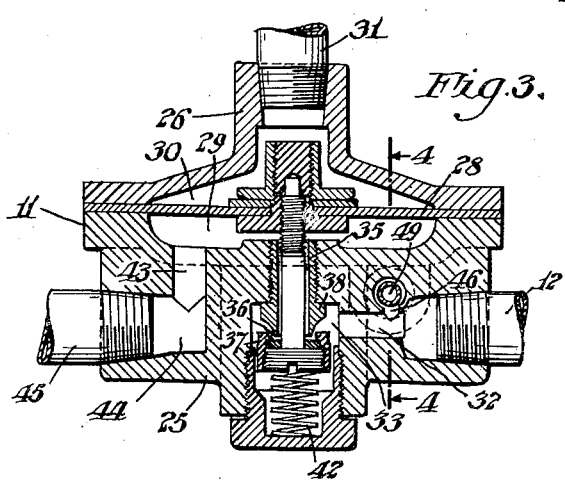
Inventor:
Coleman B. Moore,
By B. T. Wolcowitz
Attorney.

Patented Sept. 26, 1944

2,359,236

UNITED STATES PATENT OFFICE 2,359,236

PNEUMATIC TRANSMISSION SYSTEM

Coleman B. Moore, Carroll Park, Pa., assignor to Moore Products Co., Philadelphia, Pa., a copartnership Application July 29, 1942, Serial No. 452,760

14 Claims. (Cl. 137—153)

This invention relates to pneumatic transmission systems, and more particularly to an improved system for pneumatically measuring a variable condition and transmitting a controlled pressure to a remote location.

It is an object of the present invention to provide a system of the character aforesaid in which a rapid response is effected in either direction upon increase or decrease of a force attendant upon a variable condition, and this without loss of sensitivity.

It is a further object of the present invention to provide, in a system of the character aforesaid, for a response which will be more rapid upon wide variation of a variable condition and slower upon a smaller variation of the variable condition, to thereby stabilize the system.

It is a further object of the present invention to provide a system of the character aforesaid having a detecting means in which a movable portion has a very limited movement, which movement has a linear characteristic.

It is a further object of the present invention to provide a detecting mechanism with a constant differential pressure maintained therein.

It is a further object of the present invention to provide a system of the character aforesaid which will use a minimum amount of supply fluid when in balance, which may require no supply fluid upon a decrease of a force attendant upon a variable condition, and which, upon an increase of the force attendant upon the variable condition, may cut off the exhaust of supply fluid.

Other objects of the invention will be apparent from the annexed specification and claims.

The nature and characteristic features of the invention will be more easily understood from the following description, taken in connection with the accompanying drawing forming part hereof, in which:

Figure 1 is a diagrammatic view of a pneumatic transmission system in accordance with the present invention;

Fig. 2 is a top plan view of a booster pilot forming part of the apparatus shown in Fig. 1;

Fig. 3 is a vertical sectional view taken approximately on the line 3—3 of Fig. 2;

Fig. 4 is a vertical sectional view taken approximately on the line 4—4 of Fig. 3; and Fig. 5 is a fragmentary vertical sectional view taken approximately on the line 5—5 of Fig. 2.

It will, of course, be understood that the description and drawing herein are illustrative merely, and that various modifications and changes may be made in the structure disclosed without departing from the spirit of the invention.

Referring more particularly to Fig. 1 of the drawing, the pneumatic transmission system therein illustrated includes a detector pilot unit 10, this being connected to a booster pilot 11, as hereinafter pointed out. A source of supply of filtered and pressure regulated fluid, such as air, is provided, and is connected to the booster pilot 11 by a pipe 12. The detector pilot unit 10 and booster pilot 11 are also connected to a suitable instrument 13, for indicating, recording, or controlling, and the instrument 13 may be graduated in units of the external force or variable condition measured. The instrument 13 may be at a remote location with respect to the detector pilot 10 and the booster pilot 11.

The detector pilot unit 10 includes a suitable pressure control member, preferably in the form of a supply nozzle 14, mounted in a fixed supporting wall 15, and adapted to be secured in its adjusted position. The supply nozzle 14 has an orifice 16 therein and a condition responsive portion is provided for controlling the discharge through the orifice 16. The condition responsive portion preferably forms part of an expansible chamber 17 and may comprise a flat plate 18 carried by a flexible metallic bellows 19 with the lower end of the bellows being secured in fluid-tight relationship to the fixed supporting wall 15. The expansible chamber 17 thus provided, in the space within the bellows 19 and outside the pressure control member 14, permits the pressure therein to be effective on the portion 18.

The free end of the pressure control member or supply nozzle 14 is preferably initially located at the desired distance from the flat lower surface of the plate 18. As hereinafter explained in detail, upon rebalancing the same differential pressure will prevail across the orifice 16 and the dimensional relationship of the plate 18 with respect to the orifice 16 will be such that a linear characteristic of the transmitted pressure is obtained.

A cover 20 may be provided for protecting the bellows 19, the upper portion 21 of the bellows cover 20 being inturned, to provide an upper limit stop for the plate 18. An internal limit stop 22 may also be provided for limiting the downward movement of the bellows plate 18.

The variable condition to be measured is effective at the detector pilot unit 10 as a force derived from any suitable variable condition source, and may be applied as a mechanical force acting on the plate 18, or may be a resultant pressure effective on the plate 18, derived from a differential measuring unit, a specific gravity meter, a flow meter, a thermometer transmission system, a liquid level, or any other variable indicator or controller.

The booster pilot 11 preferably includes a lower casing section 25 and an upper casing section 26 secured together by screws 27 and with a flexible diaphragm 28 interposed therebetween to provide suitable pressure chambers 29 and 30. A pipe 31 is connected from the pressure chamber 30 within the upper casing member 26 and above the diaphragm 28 to the interior of the supply nozzle 14 of the detector pilot 10. The lower casing section 25 has the supply pipe 12 connected thereto, and a passageway 32 in communication with the supply pipe 12 leads to a chamber 33 within the lower casing section 25.

A valve stem 35 is provided, and connected to the diaphragm 28 for movement therewith in accordance with the pressure conditions in the chambers 29 and 30. The lower end of the valve stem 35 is provided with a seating member 36. The seating member 36 may be held in place by a suitable retainer 37. A valve seat member 38 is provided, carried by the casing section 25 and the seating member 36 is adapted to be spaced therefrom in accordance with the positioning of the valve stem 35, to control the delivery of supply fluid to the chamber 29 from the chamber 33. The pressure of the supply fluid delivered from the chamber 33 to the chamber 29 is thus controlled in accordance with the positioning of the diaphragm 28. Fluid is discharged from the chamber 29, as hereinafter pointed out, through a passageway 40.

A compression spring 42 is provided, in engagement with the valve member 35 for biasing the same upwardly, the force exerted by the spring 42 being predetermined in accordance with the differential desired between the pressures in the chamber 29 and in the chamber 30, and so that a higher pressure will normally be available in the chamber 30 than in the chamber 29. The chamber 29 is in communication, through passageways 43 and 44, with the pipe 45 which communicates with the pressure chamber 17 in the detector pilot unit 10 and with the instrument 13.

A supply passageway 46 is also provided, in communication with a restriction member, such as the restriction screw 48 shown in Fig. 4. The restriction screw 48, as illustrated, has a central bore 49 in communication with the passageway 46 through an opening 50. The bore 49 is terminated in an orifice 51, for effecting a decrease in the pressure of the supply fluid from the pipe 12. The discharge side of the orifice 51 is in communication with the chamber 30 through passageways 52, 53, and 54, for supplying fluid at reduced pressure to the chamber 30 and therefrom, through the pipe 31 to the supply nozzle 14.

A discharge control valve 55 is provided responsive to the pressure conditions in the chambers 29 and 30 for controlling the discharge of fluid from the chamber 29 through the passageway 40. The discharge control valve 55 has a regulating effect on the speed of response and also prevents unnecessary waste of supply fluid.

The discharge control valve 55 preferably includes a flexible metallic bellows 56 enclosed within a cover 57, the cover 57 and the bellows 56 being secured to the upper casing 26 in fluid-tight relationship, and the space 58 between the bellows 56 and the cover 57 being in communication with the chamber 30 through a passageway 58ª. The bellows 56 has a valve stem 59 connected thereto for movement therewith. The lower end of the valve stem is shaped to function as a valve seating member 61 and a discharge valve seat member 60 is mounted in the lower casing 25. The discharge valve seat member 60 is threaded in the lower casing 25, has a discharge opening 63 therethrough, may be adjusted to the desired position for the control of the discharge from the chamber 29, and may be soldered or otherwise fixedly retained in its adjusted position with respect to a positioning nut 60ª. The seat member 60 may then be removed for cleaning and readily replaced to the same position. The discharge passageway 40 from the chamber 29 extends to the space above the valve seat 60, and a passageway 62 is provided around the valve stem 59 so that the pressure effective in the chamber 29 is also effective in the space 63 within the bellows 56.

The mode of operation of the system will now be pointed out in detail, it being assumed first that the system is in a balanced or normal condition.

Supply fluid, at a regulated and constant pressure, is delivered through the pipe 12 to the booster pilot 11. A portion of the supplied fluid passes through the passageway 46, the central bore 49 of the restriction member 48, the orifice 51, the passageways 52, 53 and 54 to the chamber 30 above the diaphragm 28. The pressure in the chamber 30 is effective on the upper face of the diaphragm 28. Fluid from the chamber 30 is delivered through the pipe 31, and the supply nozzle 14, and discharges through the orifice 16 into the pressure chamber 17. The discharge of fluid through the orifice 16 is controlled by the spacing of the lower surface of the plate 18 with respect to the orifice 16 and this in turn controls the pressure on the inlet side of the orifice 16. The chamber 17 is in free communication with the chamber 29 below the diaphragm 28, through the pipe 45 and the passageways 44 and 43, so that the same pressure prevails in the chamber 17 and in the chamber 29.

Supply fluid, from the pipe 12, is also delivered through the passageway 32 to the space 33 and therefrom past the valve seating member 36 and the valve seat 38 to the chamber 29 below the diaphragm 28. The pressure of the fluid supplied to the chamber 29 is controlled by the extent of opening of the valve seating member 36 with respect to the valve seat 38 and will normally be less than that effective in the chamber 30 because of the force exerted by the spring 42.

Fluid is also discharged from the pressure chamber 29 through the passageway 40, and the discharge is controlled by the positioning of the discharge control valve 61 with respect to the seat 60. The resultant of pressure from the chamber 30 in the space 58 and the pressure from the chamber 29 in the space 63 determine the positioning of the control valve 61 and for equilibrium conditions only a minimum quantity of fluid is discharged.

Pressure fluid will thus be supplied by the pipe 12 and delivered at differing pressures to the chambers 29 and 30. Fluid will be supplied from the chamber 30 through the pipe 31 to the supply nozzle 14 and will flow through the orifice 16 into the chamber 17. A constant differential pressure will thus prevail on opposite sides of the orifice 16 and the plate 18 will occupy a dimensional relationship with respect to the nozzle 14 attendant upon the maintenance of the constant differential pressure. The pilot valve 36 of the booster pilot 11 will be positioned by reason of the pressures prevailing in the chambers 29 and 30 so as to permit a very small flow from the supply to the chamber 29 in the balanced position. The discharge control valve 61 will be positioned by the resultant of the pressures prevailing in the chambers 29 and 30 and will normally permit of a slight leakage or bleed through the passageway 40 and through the opening 63.

The system is thus in balanced condition and ready for response to the effect of a variable condition applied upon the plate 18.

Upon a gradual or slow increase in the force acting on the plate 18 there will be a gradual or slow tendency of the plate 18 to move toward the supply nozzle 14 against the upward force of the pressure in the chamber 17 and the force of the bellows 19. The flow through the orifice 16 will be decreased by reason of the closer spacing of the lower surface of the plate 18 with respect to the orifice 16. This will cause a building up of the pressure within the pipe 31 and within the chamber 30. This increase in pressure will tend to move the diaphragm 28 and the valve stem 35 carried thereby downwardly. The valve seating member 36 is thereby moved to a position further away from the valve seat member 38, and permits an increase of pressure to be effective in the chamber 29.

As the pressure in the chamber 30 increases this increase is effective outside the bellows 56 for reducing the discharge past the valve 61. The decrease of discharge aids the building up of the pressure in the chamber 29 in a manner to provide a response determined by the character of application of the variable condition on the detector pilot 10. As the pressure in the chamber 29 increases this is effective within the bellows 56 for restoring the valve 61 to a position for discharge control in accordance with the resultant of the pressures acting on the bellows 56. The increased pressure in the chamber 29 is also effective through the pipe 45 and in the pressure chamber 17, and this increase in pressure will restore the bellows plate 18 to a position with respect to the supply nozzle 14 to maintain a constant differential or pressure drop across the orifice 16. By reason of the maintenance of this constant differential or pressure drop across the orifice 16 the slight movement of the bellows plate 18 which occurs has a linear characteristic and upon re-balancing a linear characteristic of the transmitted pressure is provided.

The pressure within the chamber 29 is effective through the pipe 45 for transmission to the instrument 13 for indicating, recording, or controlling. The pressure relationship thus established in the chambers 17 and 29, in accordance with the force applied on the plate 18, will be directly proportional to the value of the applied force of the variable condition.

Upon a decrease in the force effective upon the plate 18, the plate 18 is initially moved away from the supply nozzle 14 and this permits increased flow through the orifice 16. This increased flow causes a pressure drop in the pipe 31 and in the chamber 30, and the decrease in pressure in the chamber 30 is effective for permitting upward movement of the diaphragm 28 and a decrease in the opening between the valve seating member 36 and the valve seat 38 to reduce the pressure of the fluid supplied to the chamber 29. Upon a decrease in the pressure in the chamber 29 the valve 61 is opened to a greater extent to permit increased discharge through the passageway 40 to reduce the pressure in the chamber 29. This pressure decrease is effective through the pipe 45 and in the chamber 17 so that the plate 18 is restored to its position with respect to the supply nozzle 14 and the orifice 16 therein for maintaining a constant differential across the orifice 16. The pressure prevailing in the chambers 17 and 29 is transmitted through the pipe 45 to the instrument 13.

Upon the sudden application of a force attendant upon a variable condition upon the plate 18, in a direction to move the same downwardly, the flow through the supply nozzle 14 is suddenly decreased or shut off. This causes a more rapid increase in the pressure in the chamber 30 than upon a gradual increase of the force acting on the plate 18. This increased pressure in the chamber 30 is effective on the diaphragm 28 and tends to open the valve 36 to permit fluid at higher pressure to flow into the chamber 29. At the same time the increase in pressure in the chamber 30 is effective upon the exterior of the bellows 56 so that the discharge through the passageway 40 is quickly reduced or may even be cut off. This aids in increasing the pressure in the chamber 29 so that the diaphragm 28 achieves its position to maintain the differential in the pressures effective in the chambers 29 and 30.

Upon a sudden application of force in the opposite direction a rapid response will be obtained in the same manner as if a gradual force had been applied, but with greater speed in accordance with the control exerted by the discharge control valve 61.

While the system could be operated with proportioning of the passageway 40 so that the same would serve as a constant bleed, the control of the discharge by changes of pressure in the chamber 29 and the chamber 30 is desirable for reducing the quantity of supply fluid required and for effecting a more rapid rate of response of the system as required.

The rebalancing of the plate 18 by the pressure effective within the chamber 17 to maintain a constant differential across the orifice 16 permits of attaining equilibrium conditions with a very small total range of movement of the plate 18 required to bring about the rebalancing. The use of a constant differential across the orifice 16, and the rebalancing of the plate 18 to maintain such a constant differential results in a movement of the plate 18 with a linear characteristic and the transmitted pressure has a linear characteristic. The desired linear characteristics of the transmitted pressure in its relationship to the variable condition are thereby obtained.

I claim:

1. In pressure transmission apparatus, means responsive to changes in a condition including a pressure chamber having a portion movable in response to changes in the condition, a pressure control member extending within said chamber and having an orifice controlled by the positioning with respect thereto of said condition responsive portion for controlling the discharge of fluid into said pressure chamber, a source of pressure fluid, means for supplying pressure fluid to said control member from said source through a restriction, and pressure transmitting means responsive to the pressure conditions on opposite sides of said orifice for controlling the pressure of the fluid transmitted from said source.

2. In a pressure transmitter, means responsive to changes in a condition including a pressure chamber having a portion movable in response to changes in the condition, a pressure control member in communication with the interior of said chamber and having an orifice controlled by said condition responsive portion for controlling the pressure conditions in said pressure chamber, a source of pressure fluid, means for supplying pressure fluid to said pressure control member from said source through a restriction, and pressure transmitting means responsive to the pressure conditions on opposite sides of said orifice for controlling the pressure of the fluid transmitted from said source and for rebalancing said movable portion to maintain a constant differential pressure across said orifice.

3. In a pressure transmitter, means responsive to changes in a condition including a pressure chamber having a portion movable in response to changes in the condition, a supply nozzle having an orifice controlled by the positioning with respect thereto of said movable portion for controlling the discharge of fluid into said pressure chamber, a source of pressure fluid, means for supplying pressure fluid from said source to said nozzle through a restriction, and pressure transmitting means responsive to the pressure conditions on opposite sides of said orifice for controlling the pressure of the fluid transmitted from said source.

4. In a pressure transmitter, a source of pressure fluid, a casing having an interior space divided by a pressure responsive member into two pressure chambers, connections for supplying pressure fluid from said source to one of said chambers through a restriction, means operated by said pressure responsive member for controlling the pressure of the fluid from said source to the other of said chambers, and means responsive to a variable condition for controlling the pressure condition in said first chamber, said condition responsive means including a pressure chamber in communication with said second chamber and having a movable condition responsive portion, and a pressure control member connected to said first chamber and having an orifice for discharge of fluid into said pressure chamber controlled by said condition responsive portion whereby the pressure in said last named pressure chamber rebalances said condition responsive portion to maintain a constant differential pressure across said orifice.

5. In a pressure transmitter, a source of pressure fluid, a casing having an interior space divided by a pressure responsive member into two pressure chambers, connections for supplying pressure fluid from said source to one of said chambers through a restriction, means operated by said pressure responsive member for controlling the pressure of the fluid from said source to the other of said chambers, and detector pilot means having a condition responsive portion, said detector pilot means including a pressure control member having an orifice connected on one side to the first of said chambers and on the other side to the other of said chambers and controlled by said condition responsive portion.

6. In a pressure transmitter, a source of pressure fluid, a casing having an interior space divided by a pressure responsive member into two pressure chambers, connections for supplying pressure fluid from said source to one of said chambers through a restriction, means operated by said pressure responsive member for controlling the pressure of the fluid from said source to the other of said chambers, and means for controlling the pressure conditions in said chambers, said means including a portion movable in response to changes in a condition and a pressure fluid supply member connected to said chambers and controlled by said condition responsive portion, and discharge members controlled by the pressures in said pressure chambers for controlling the discharge of fluid from one of said pressure chambers.

7. In a pressure transmitter, a source of pressure fluid, a casing having an interior space divided by a pressure responsive member into two pressure chambers, connections for supplying pressure fluid from said source to one of said chambers through a restriction, means operated by said pressure responsive member for controlling the pressure of the fluid from said source to the other of said chambers, means for controlling the pressure conditions in said chambers, said means including an expansible chamber having a wall movable in response to changes in a condition and a nozzle member connected on opposite sides thereof to said chambers and controlled by the spacing with respect thereto of said wall, and discharge members controlled by the pressures in said chambers for controlling the discharge of fluid from one of said chambers.

8. In pressure transmission apparatus, a detector pilot comprising an expansible chamber member having a wall portion movable in response to a change in a condition, a pressure fluid supply nozzle in communication with the interior of said chamber member, a source of pressure fluid, means for supplying pressure fluid from said source to said nozzle through a restriction, said movable wall portion controlling the flow through said nozzle by its positioning with respect to said nozzle, and means controlled by the positioning of said wall with respect to said nozzle for supplying fluid for rebalancing said wall portion at a position in spaced relationship with respect to said nozzle to maintain a constant pressure drop across said nozzle.

9. In pressure transmission apparatus, a source of pressure fluid, detector pilot means having a portion movable in response to changes in a variable condition, booster pilot means controlled by said detector pilot means for transmitting fluid under pressure from said source, a bleed connection for said booster pilot, and discharge control means on said booster pilot means for controlling the discharge of the supplied fluid therefrom through said bleed connection.

10. In pressure transmission apparatus, a detector pilot comprising a pressure fluid supply nozzle having an orifice with an inlet side and a discharge side, a source of fluid pressure connected to said inlet side, an expansible chamber with which the discharge side of said orifice is in communication, said chamber having a wall portion movable in response to a change in a condition for controlling the discharge through said orifice and thereby the pressure on the inlet side of said orifice, and means controlled by the positioning of said wall with respect to said nozzle for supplying pressure fluid for rebalancing said wall portion in spaced relationship with respect to said nozzle whereby a constant pressure differential is maintained across said nozzle.

11. In pressure transmission apparatus, a source of pressure fluid, detector pilot means having a portion movable in response to a change in a variable condition, booster pilot means controlled by said detector pilot means for transmitting fluid under pressure from said source and for rebalancing said movable portion to a predetermined position, and means on said booster pilot means for controlling the discharge of supplied fluid in accordance with the rate of application of the variable condition.

12. In pressure transmission apparatus, a source of pressure fluid, detector pilot means having a portion responsive to changes in a variable condition and a differential pressure member controlled by said responsive portion, booster pilot means having a differential pressure responsive pressure transmitting member controlled by said detector pilot means and supplying fluid to said detector pilot means for rebalancing the responsive portion to a position to maintain a constant differential pressure at said differential pressure member, and discharge control members responsive to the pressures effective on said transmitting members for controlling the discharge of fluid from said booster pilot means.

13. In pressure fluid control apparatus, a detector pilot comprising a flexible metallic bellows having a fixed closure wall and an end closure wall movable in response to changes in a variable condition, said bellows providing an expansible pressure chamber and one face of the movable end closure wall providing a flat flow control surface, means for supplying pressure fluid to the said pressure chamber and against said movable closure wall for rebalancing said movable closure wall against the force exerted by said condition changes to substantially its initial position, and a fixedly mounted pressure fluid control nozzle extending to a position closely spaced with respect to said control surface, said nozzle having a port controlled by the positioning of said control surface with respect thereto for controlling the rebalancing pressure effective on said movable closure wall.

14. In pressure fluid control apparatus, a detector pilot comprising a flexible metallic bellows having a fixed closure wall and an end closure wall movable in response to changes in a variable condition, the interior of said bellows providing an expansible pressure chamber and the interior face of the movable end closure wall providing a flat flow control surface, means for supplying pressure fluid to the said pressure chamber and against said movable closure wall for rebalancing said movable closure wall against the force exerted by said condition changes to substantially its initial position, and a fixedly mounted pressure fluid control nozzle extending within said chamber to a position closely spaced with respect to said control surface, said nozzle having a port controlled by the positioning of said control surface with respect thereto for controlling the rebalancing pressure effective on said movable closure wall.

COLEMAN B. MOORE.